(12) United States Patent
Lee et al.

(10) Patent No.: US 10,987,896 B2
(45) Date of Patent: Apr. 27, 2021

(54) DISPLAY DEVICE AND METHOD OF MANUFACTURING THE SAME

(71) Applicant: SAMSUNG DISPLAY CO., LTD., Yongin-si (KR)

(72) Inventors: Jongsuk Lee, Asan-si (KR); Donghun No, Cheongju-si (KR); Soyeon Eom, Daegu (KR); Kyungsu Lee, Hwaseong-si (KR); Jinhwa Jeon, Osan-si (KR); Youngkuil Joo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 881 days.

(21) Appl. No.: 15/146,640

(22) Filed: May 4, 2016

(65) Prior Publication Data

US 2017/0080680 A1    Mar. 23, 2017

(30) Foreign Application Priority Data

Sep. 18, 2015  (KR) .......................... 10-2015-0132499

(51) Int. Cl.
*B32B 7/02*        (2019.01)
*B32B 37/12*       (2006.01)
(Continued)

(52) U.S. Cl.
CPC .................. *B32B 7/02* (2013.01); *B32B 7/12* (2013.01); *B32B 37/12* (2013.01); *G06F 1/1652* (2013.01);
(Continued)

(58) Field of Classification Search
CPC .. B32B 37/12; B32B 7/02; B32B 7/12; B32B 2305/72; B32B 2310/0831; B32B 2457/20; G06F 1/1652
See application file for complete search history.

(56) References Cited

U.S. PATENT DOCUMENTS 9,029,846 B2    5/2015  Song et al.
9,250,656 B2    2/2016  Hirai et al.
(Continued)

FOREIGN PATENT DOCUMENTS

CN    102916033 A    2/2013
CN    103810945 A    5/2014
(Continued)

*Primary Examiner* — Frank J Vineis
*Assistant Examiner* — Laura B Figg
(74) *Attorney, Agent, or Firm* — Lewis Roca Rothgerber Christie LLP

(57) ABSTRACT

There is provided a display device including a first member, a window on the first member, a first adhesive layer between the first member and the window, and a light blocking layer between the window and the first adhesive layer, the window including a first window portion contacting the first adhesive layer and including a bending portion and a non-bending portion, and a second window portion connected to the bending portion, the second window portion being spaced from the non-bending portion and contacting the light blocking layer, wherein the first adhesive layer includes, a first adhesive portion including a first sub-adhesive portion contacting the bending portion, and a second sub-adhesive portion contacting the non-bending portion, and a second adhesive portion contacting the light blocking layer, and wherein the first sub-adhesive portion has a modulus less than a modulus of each of the second sub-adhesive portion and the second adhesive portion.

14 Claims, 9 Drawing Sheets

(51) Int. Cl.
  *B32B 7/12* (2006.01)
  *G06F 1/16* (2006.01)
(52) U.S. Cl.
  CPC ... *B32B 2305/72* (2013.01); *B32B 2310/0831* (2013.01); *B32B 2457/20* (2013.01)

(56) References Cited

U.S. PATENT DOCUMENTS

| | | | |
|---|---|---|---|
| 9,580,625 B2 | 2/2017 | Fuchi et al. | |
| 9,697,764 B2 | 7/2017 | Kim et al. | |
| 2012/0328800 A1* | 12/2012 | Yoon | C09J 133/062 |
| | | | 428/1.55 |
| 2013/0034685 A1 | 2/2013 | An et al. | |
| 2014/0132488 A1* | 5/2014 | Kim | H01L 51/52 |
| | | | 345/76 |
| 2014/0233194 A1 | 8/2014 | Hongo et al. | |
| 2014/0285953 A1* | 9/2014 | Hirai | G06F 1/1637 |
| | | | 361/679.01 |
| 2014/0295157 A1 | 10/2014 | Hirai et al. | |
| 2014/0300965 A1 | 10/2014 | Takeda et al. | |
| 2014/0367644 A1* | 12/2014 | Song | H01L 51/0097 |
| | | | 257/40 |
| 2015/0043174 A1 | 2/2015 | Han et al. | |
| 2015/0049428 A1* | 2/2015 | Lee | G06F 1/1652 |
| | | | 361/679.27 |

FOREIGN PATENT DOCUMENTS

| | | |
|---|---|---|
| CN | 103857760 A | 6/2014 |
| CN | 103858158 A | 6/2014 |
| CN | 104064119 A | 9/2014 |
| CN | 104070746 A | 10/2014 |
| CN | 104241316 A | 12/2014 |
| JP | 2012-194289 A | 10/2012 |
| KR | 10-2014-0139295 A | 12/2014 |
| KR | 10-2015-0004679 A | 1/2015 |
| KR | 10-2015-0043078 A | 4/2015 |

* cited by examiner

DISPLAY DEVICE AND METHOD OF MANUFACTURING THE SAME

CROSS-REFERENCE TO RELATED APPLICATION

This U.S. non-provisional patent application claims priority to, and the benefit of, Korean Patent Application No. 10-2015-0132499, filed on Sep. 18, 2015, the content of which is hereby incorporated by reference in its entirety.

BACKGROUND

1. Field

The present disclosure relates to a display device and a method of manufacturing the same.

2. Description of the Related Art

A display device displays a variety of images on its display screen to provide a user with information. In recent years, a bendable display device has been developed. The bendable display device is generally either flexible or rigid. When the bendable display device is flexible, a portion of the display device is bent, folded, rolled, or curved like a paper. In addition, when the bendable display device is rigid, the display device may be maintained in a bent state. Different from a flat panel display device, because the bendable display device is deformable into various shapes, the bendable display device is easy to carry, and improves user's convenience.

SUMMARY

Aspects of embodiments of the present disclosure are directed to a display device having improved (e.g., increased) durability, and a method of manufacturing the display device.

According to some embodiments of the present inventive concept, there is provided a display device including: a first member; a window on the first member; a first adhesive layer between the first member and the window; and a light blocking layer between the window and the first adhesive layer, the window including: a first window portion contacting the first adhesive layer and including a bending portion and a non-bending portion; and a second window portion connected to the bending portion, the second window portion being spaced from the non-bending portion and contacting the light blocking layer, wherein the first adhesive layer includes: a first adhesive portion including a first sub-adhesive portion contacting the bending portion, and a second sub-adhesive portion contacting the non-bending portion; and a second adhesive portion contacting the light blocking layer, and wherein the first sub-adhesive portion has a modulus that is less than a modulus of each of the second sub-adhesive portion and the second adhesive portion.

In an embodiment, the first sub-adhesive portion has a hardness that is less than a hardness of each of the second sub-adhesive portion and the second adhesive portion.

In an embodiment, the first sub-adhesive portion contacts one side surface of the light blocking layer, and contacts the bending portion.

In an embodiment, the modulus of the second sub-adhesive portion is equal to or less than the modulus of the second adhesive portion.

In an embodiment, the bending portion includes: a first bending portion connected to the non-bending portion; and a second bending portion connected to the non-bending portion and spaced from the first bending portion, and wherein the first sub-adhesive portion includes: a first bending adhesive portion contacting the first bending portion; and a second bending adhesive portion contacting the second bending portion.

In an embodiment, the light blocking layer includes: a first light blocking layer; and a second light blocking layer spaced from the first light blocking layer, wherein the second window portion includes: a first sub-window portion connected to the first window portion and the first light blocking layer; and a second sub-window portion connected to the first window portion and the second light blocking layer, the second sub-window portion being spaced from the first sub-window portion, wherein the second adhesive portion includes: a third sub-adhesive portion contacting the first light blocking layer; and a fourth sub-adhesive portion contacting the second light blocking layer, and wherein a modulus of the first bending adhesive portion and a modulus of the second bending adhesive portion are each less than each of a modulus of the third sub-adhesive portion and a modulus of the fourth sub-adhesive portion.

In an embodiment, the first member includes at least one of a polarizing plate, a display panel, and a touch screen panel.

In an embodiment, the first adhesive layer includes a UV curing agent.

In an embodiment, the first adhesive layer includes at least one of an acrylic-based compound or an acrylic-based copolymer.

In an embodiment, the display device further includes: a second member under the first member; and a second adhesive layer between the first member and the second member.

In an embodiment, the first member includes: a first member portion contacting the first adhesive portion; and a second member portion contacting the second adhesive portion, wherein the second adhesive layer includes: a third adhesive portion contacting the first member portion; and a fourth adhesive portion contacting the second member portion, wherein the first member portion includes: a first bending member portion contacting the first sub-adhesive portion; and a first non-bending member portion contacting the second sub-adhesive portion, wherein the third adhesive portion includes: a fifth sub-adhesive portion contacting the first bending member portion; and a sixth sub-adhesive portion contacting the first non-bending member portion, and wherein the fifth sub-adhesive portion has a modulus that is less than each of a modulus of the sixth sub-adhesive portion and a modulus of the fourth adhesive portion.

In an embodiment, the modulus of the sixth sub-adhesive portion is equal to the modulus of the fourth adhesive portion.

In an embodiment, the modulus of the sixth sub-adhesive portion is less than the modulus of the fourth adhesive portion.

In an embodiment, the second member is different from the first member, and each of the first and second members includes at least one of a polarizing plate, a display panel, and a touch screen panel.

According to some embodiments of the present inventive concept, there is provided a method of manufacturing a display device, the method including: preparing a first adhesive layer including a first adhesive portion and a second adhesive portion, the first adhesive portion including a first sub-adhesive portion and a second sub-adhesive portion; curing the first adhesive layer such that a hardness of the first sub-adhesive portion is less than each of a hardness of the second sub-adhesive portion and a hardness of the second adhesive portion; attaching the first adhesive layer to a light blocking layer and to a window; and attaching the first adhesive layer to a first member, wherein the window includes: a first window portion including a bending portion and a non-bending portion; and a second window portion connected to the bending portion, spaced from the non-bending portion, and contacting the light blocking layer, and wherein the attaching of the window include attaching the first sub-adhesive portion to the bending portion, attaching the second sub-adhesive portion to the non-bending portion, and attaching the second adhesive portion to the second window portion.

In an embodiment, the curing of the first adhesive layer includes: providing a mask above the first adhesive layer; and applying a UV light to the first adhesive layer using the mask.

In an embodiment, the curing of the first adhesive layer is performed before or after the attaching of the first adhesive layer to the light blocking layer and the window.

In an embodiment, the curing of the first adhesive layer is performed such that a modulus of the first sub-adhesive portion is less than each of a modulus of the second sub-adhesive portion and a modulus of the second adhesive portion.

According to the above, the display device may be manufactured to have improved (e.g., increased) durability.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1A:
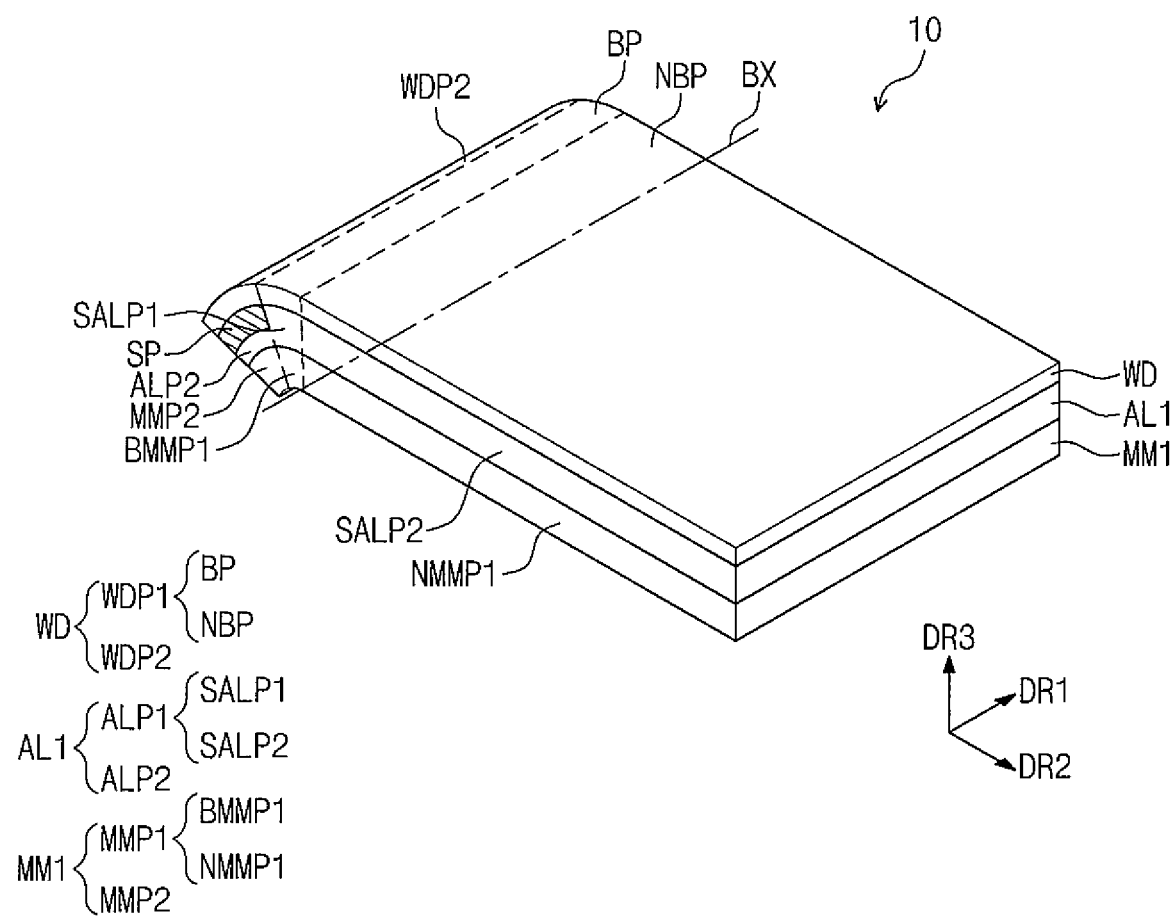
FIG. 1A is a perspective view showing a display device according to an exemplary embodiment of the present disclosure.
Figure 1B:
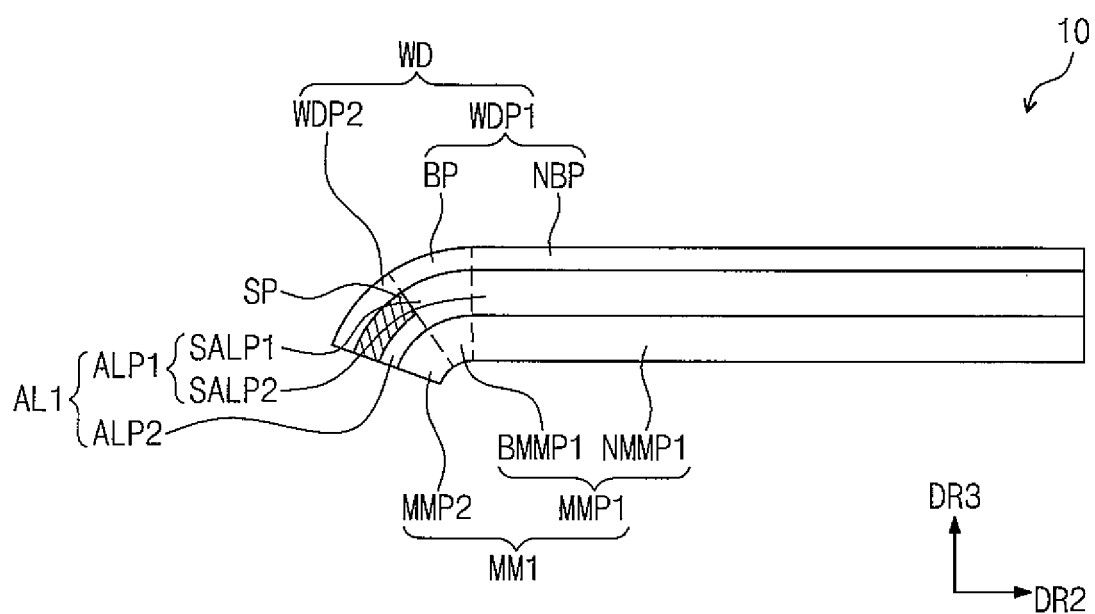
FIG. 1B is a cross-sectional view showing the display device shown in FIG. 1A.

FIG. 1A is a perspective view showing a display device 10 according to an exemplary embodiment of the present disclosure, and FIG. 1B is a cross-sectional view showing the display device 10 shown in FIG. 1A.

Referring to FIGS. 1A and 1B, the display device 10 includes a first member MM1, a window WD, a light blocking layer SP, and a first adhesive layer AL1. The first member MM1 may include at least one of a polarizing plate, a display panel, and a touch screen panel. For instance, the first member MM1 may be the polarizing plate, the display panel, or the touch screen panel. The first member MM1 may include the display panel, the polarizing plate, and the touch screen panel, which are sequentially stacked along a third direction DR3, or may include the display panel and the touch screen panel (while omitting the polarizing plate), which are sequentially stacked along the third direction DR3. However, the first member MM1 should not be limited thereto or thereby. That is, the first member MM1 may have various suitable stack structures as long as the first member MM1 includes at least one of the polarizing plate, the display panel, and the touch screen panel.

The display panel may be, but is not limited to, an organic light emitting display panel, a liquid crystal display panel, a plasma display panel, an electrophoretic display panel, a microelectromechanical system (MEMS) display panel, or an electrowetting display panel.

The first member MM1 may be flexible or rigid. The term "flexible" used herein means that the first member MM1 may be curved, e.g., the first member MM1 is fully folded or slightly curved.

The first member MM1 includes a first member portion MMP1 and a second member portion MMP2. The first member portion MMP1 and the second member portion MMP2 are connected to each other, and extend along a second direction DR2 (which is substantially orthogonal to the third direction DR3). The first member portion MMP1 makes contact with (e.g., is adhered to) a first adhesive portion ALP1. The second member portion MMP2 is connected to the first member portion MMP1. The second member portion MMP2 makes contact with (e.g., is adhered to) a second adhesive portion ALP2. The first member portion MMP1 includes a first bending member portion BMMP1 and a first non-bending member portion NMMP1. The first bending member portion BMMP1 is bent with respect to (e.g., about) a bending axis BX extending in a first direction DR1 (which is orthogonal to the second and third directions DR2 and DR3). The term "bending" used herein means that the first bending member portion BMMP1 may be curved by an external force.

The first bending member portion BMMP1 makes contact with (e.g., is adhered to) a first sub-adhesive portion SALP1. The first non-bending member portion NMMP1 is connected to the first bending member portion BMMP1. The first non-bending member portion NMMP1 may be flat, or unbent. The first non-bending member portion NMMP1 makes contact with (e.g., is adhered to) a second sub-adhesive portion SALP2.

The window WD is disposed on the first member MM1. The window WD may be flexible or rigid. The window WD may be, but is not limited to, a cover glass. The window WD may include glass or organic polymer.

The window WD includes a first window portion WDP1 and a second window portion WDP2. The first and second window portions WDP1 and WDP2 are connected to each other and generally extend along the second direction DR2.

The first window portion WDP1 makes contact with (e.g., is adhered to) the first adhesive layer AL1 and does not make contact with the light blocking layer SP. The first window portion WDP1 includes a bending portion BP and a non-bending portion NBP. The bending portion BP is bent with respect to (e.g., about) the bending axis BX extending in the first direction DR1. The non-bending portion NBP is connected to the bending portion BP. The non-bending portion NBP may be flat, or unbent.

The second window portion WDP2 makes contact with the light blocking layer SP and does not make contact with the first adhesive layer AL1. The second window portion WDP2 is connected to the first window portion WDP1. The second window portion WDP2 is spaced from the non-bending portion NBP and is connected to the bending portion BP. The second window portion WDP2 may be bent with respect to (e.g., about) the bending axis BX, or may be flat without being bent.

The light blocking layer SP is between the window WD and the first adhesive layer AL1. The light blocking layer SP may be, but is not limited to, a black matrix. The light blocking layer SP makes contact with the second window portion WDP2, and does not make contact with the first window portion WDP1.

The first adhesive layer AL1 is between the first member MM1 and the window WD. The first adhesive layer AL1 attaches the first member MM1 to the window WD. The first adhesive layer AL1 may include at least one of an acrylic-base compound and/or an acrylic-based copolymer, although the first adhesive layer AL1 should not be limited thereto or thereby. For example, the first adhesive layer AL1 may include a UV curing agent.

The first adhesive layer AL1 includes the first adhesive portion ALP1 and the second adhesive portion ALP2. The first and second adhesive portions ALP1 and ALP2 are connected to each other and extend along the second direction DR2. The first adhesive portion ALP1 makes contact with (e.g., is adhered to) the first window portion WDP1 and the first member portion MMP1. The first adhesive portion ALP1 is attached to (e.g., is adhered to) each of the first window portion WDP1 and the first member portion MMP1 to fix (e.g., to attach or to adhere) the first window portion WDP1 and the first member portion MMP1 to each other. The second adhesive portion ALP2 is connected to the first adhesive portion ALP1. The second adhesive portion ALP2 makes contact with (e.g., is adhered to) the light blocking layer SP and the second member portion MMP2. The second adhesive portion ALP2 is attached to (e.g., is adhered to) each of the light blocking layer SP and the second member portion MMP2 to fix the light blocking layer SP and the second member portion MMP2 to each other.

The first adhesive portion ALP1 includes the first sub-adhesive portion SALP1 and the second sub-adhesive portion SALP2. The first and second sub-adhesive portions SALP1 and SALP2 are connected to each other and generally extend along the second direction DR2. The first sub-adhesive portion SALP1 makes contact with (e.g., is adhered to) the bending portion BP and the first bending member portion BMMP1. The first sub-adhesive portion SALP1 is attached to the bending portion BP and the first bending member portion BMMP1 to fix the bending portion BP and the first bending member portion BMMP1 to each other. The second sub-adhesive portion SALP2 makes contact with (e.g., is adhered to) the non-bending portion NBP and the first non-bending member portion NMMP1. The second sub-adhesive portion SALP2 is attached to each of the non-bending portion NBP and the first non-bending member portion NMMP1 to fix the non-bending portion NBP and the first non-bending member portion NMMP1 to each other.

The first sub-adhesive portion SALP1 has a modulus (e.g., a modulus of elasticity) that is less than a modulus of each of the second sub-adhesive portion SALP2 and the second adhesive portion ALP2. The first sub-adhesive portion SALP1 has a hardness that is less than a hardness of each of the second sub-adhesive portion SALP2 and the second adhesive portion ALP2.

The second sub-adhesive portion SALP2 has substantially the same modulus as that of the second adhesive portion ALP2. The second sub-adhesive portion SALP2 has substantially the same hardness as that of the second adhesive portion ALP2. However, according to some embodiments, the modulus of the second sub-adhesive portion SALP2 may be less than that of the second adhesive portion ALP2, and the hardness of the second sub-adhesive portion SALP2 may be less than that of the second adhesive portion ALP2.

The display device 10 according to the present exemplary embodiment may be operated in a first mode and in a second mode. In the first mode, at least a portion of the window WD and the first member MM1 is bent (e.g., may be bent with respect to, or about, the bending axis BX). The bending of the window WD and the first member MM1 is stretched out (e.g., flat) in the second mode.

Figure 2A:
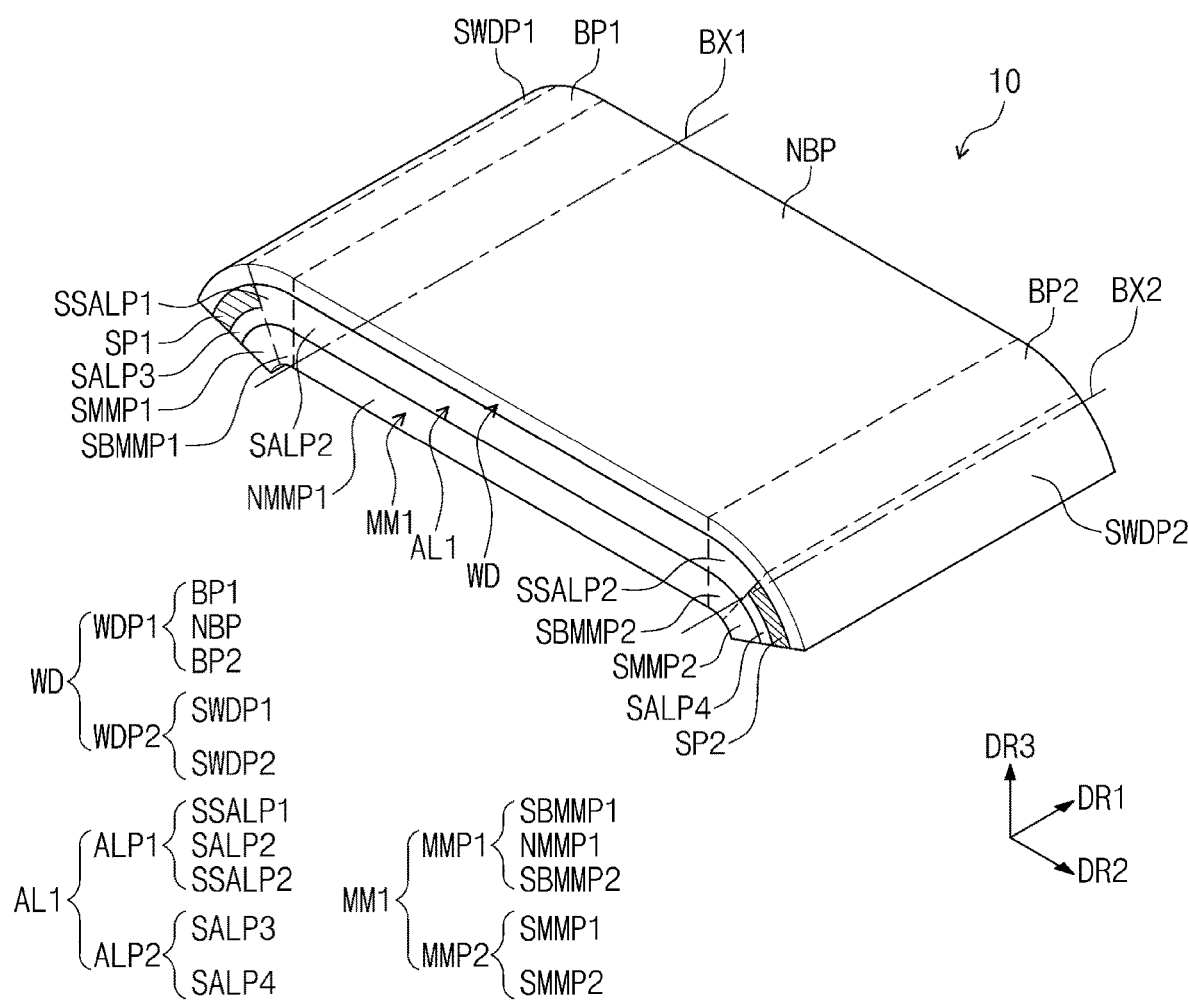
FIG. 2A is a perspective view showing a display device according to an exemplary embodiment of the present disclosure.
Figure 2B:
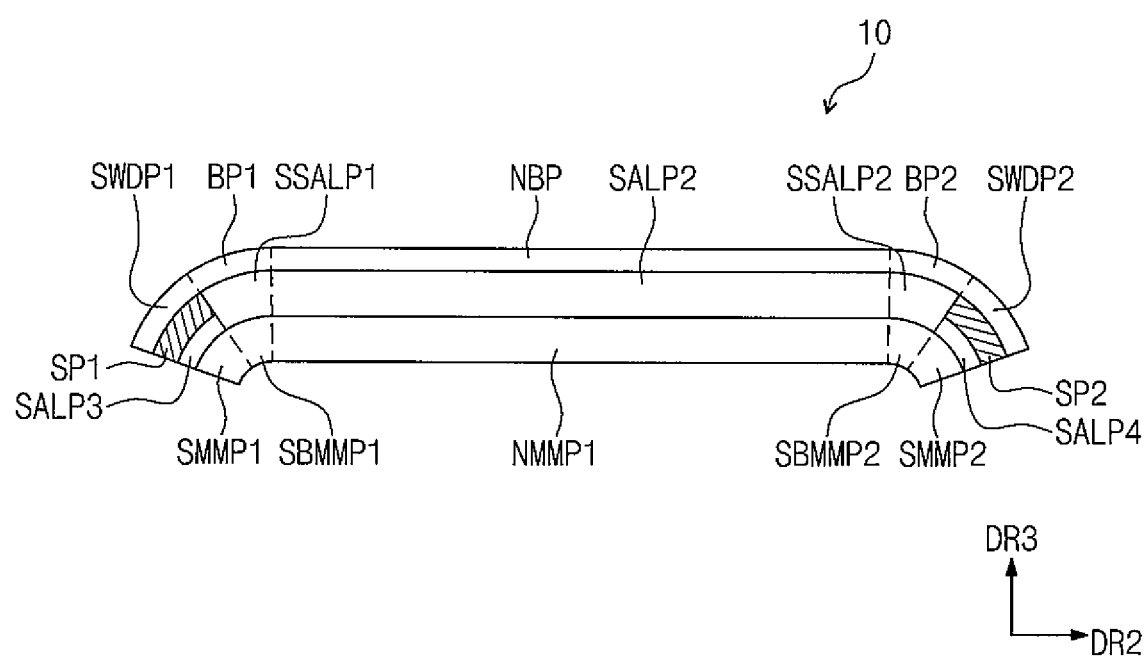
FIG. 2B is a cross-sectional view showing the display device shown in FIG. 2A.

FIG. 2A is a perspective view showing a display device 10 according to an exemplary embodiment of the present disclosure, and FIG. 2B is a cross-sectional view showing the display device 10 shown in FIG. 2A.

Hereinafter, the display device 10 according to the present exemplary embodiment will be described in detail with reference to FIGS. 2A and 2B. In FIGS. 2A and 2B, features of the display device that are different from those of the display device shown in FIGS. 1A and 1B are primarily described.

Referring to FIGS. 2A and 2B, the display device 10 includes a first member MM1, a window WD, light blocking layers SP1 and SP2, and a first adhesive layer AL1. The first member MM1 includes at least one of the polarizing plate, the display panel, and the touch screen panel. The first member MM1 may be flexible or rigid.

The first member MM1 includes a first member portion MMP1 and a second member portion MMP2. The first member portion MMP1 and the second member portion MMP2 are connected to each other, and extend along the second direction DR2. The first member portion MMP1 makes contact with a first adhesive portion ALP1. The first member portion MM1 includes first bending member portions SBMMP1 and SBMMP2 and a first non-bending member portion NMMP1. The first bending member portions SBMMP1 and SBMMP2 respectively make contact with first sub-adhesive portions SSALP1 and SSALP2. The first non-bending member portion NMMP1 is connected to the first bending member portions SBMMP1 and SBMMP2. The first non-bending member portion NMMP1 may be flat without being bent. The first non-bending member portion NMMP1 makes contact with the second sub-adhesive portion SALP2.

The first bending member portions SBMMP1 and SBMMP2 include a first sub-bending member portion SBMMP1 and a second sub-bending portion SBMMP2. The first sub-bending member portion SBMMP1 is connected to the first non-bending member portion NMMP1. The first sub-bending member portion SBMMP1 is bent with respect to (e.g., about) a first bending axis BX1 extending in a first direction DR1. The first sub-bending member portion SBMMP1 makes contact with the first bending adhesive portion SSALP1. The second sub-bending member portion SBMMP2 is connected to the first non-bending member portion NMMP1, and is spaced from the first sub-bending member portion SBMMP1. The second sub-bending member portion SBMMP2 is bent with respect to (e.g., about) a second bending axis BX2 extending in the first direction DR1. The second sub-bending member portion SBMMP2 makes contact with the second bending adhesive portion SSALP2.

The second member portion MMP2 is connected to the first member portion MMP1. The second member portion MMP2 makes contact with a second adhesive portion ALP2. The second member portion MMP2 includes a first sub-member portion SMMP1 and a second sub-member portion SMMP2. The first sub-member portion SMMP1 is connected to the first member portion MMP1. The first sub-member portion SMMP1 makes contact with a third sub-adhesive portion SALP3. The second sub-member portion SMMP2 is connected to the first member portion MMP1, and is spaced from the first sub-member portion SMMP1. The second sub-member portion SMMP2 makes contact with a fourth sub-adhesive portion SALP4.

The window WD is on the first member MM1. The window WD may be flexible or rigid. The window WD includes a first window portion WDP1 and a second window portion WDP2. The first window portion WDP1 makes contact with the first adhesive layer AL1 and does not make contact with the light blocking layers SP1 and SP2.

The first window portion WDP1 includes bending portions BP1 and BP2 and a non-bending portion NBP. The bending portions BP1 and BP2 may be bent. The non-bending portion NBP may be flat without being bent. The bending portions BP1 and BP2 include a first bending portion BP1 and a second bending portion BP2. The first bending portion BP1 is connected to the non-bending portion NBP. The first bending portion BP1 is bent with respect to (e.g., about) the first bending axis BX1 extending in the first direction DR1. The second bending portion BP2 is connected to the non-bending portion NBP and spaced from the first bending portion BP1. The second bending portion BP2 is bent with respect to (e.g., about) the second bending axis BX2 extending in the first direction DR1. The second window portion WDP2 makes contact with the light blocking layers SP1 and SP2, and does not make contact with the first adhesive layer AL1.

The second window portion WDP2 includes a first sub-window portion SWDP1 and a second sub-window portion SWDP2. The first sub-window portion SWDP1 is connected to the first window portion WDP1. The first sub-window portion SWDP1 makes contact with the first light blocking layer SP1. The first sub-window portion SWDP1 does not make contact with the first adhesive layer AL1. The second sub-window portion SWPD2 is connected to the first window portion WDP1, and is spaced from the first sub-window portion SWDP1. The second sub-window portion SWDP2 makes contact with the second light blocking layer SP2. The second sub-window portion SWDP2 does not make contact with the first adhesive layer AL1.

The light blocking layers SP1 and SP2 are between the window WD and the first adhesive layer AL1. The light blocking layers SP1 and SP2 include the first light blocking layer SP1, and the second light blocking layer SP2 spaced from the first light blocking layer SP1. The first light blocking layer SP1 makes contact with the first sub-window portion SWDP1. The second light blocking layer SP2 makes contact with the second sub-window portion SWDP2.

The first adhesive layer ALA is between the first member MM1 and the window WD. The first adhesive layer AL1 includes a first adhesive portion ALP1 and a second adhesive portion ALP2. For instance, the first and second adhesive portions ALP1 and ALP2 are connected to each other, and extend along the second direction DR2. The first adhesive portion ALP1 makes contact with (e.g., is adhered to) the first window portion WDP1 and the first member portion MMP1. The first adhesive portion ALP1 is attached to each of the first window portion WDP1 and the first member portion MMP1 to fix the first window portion WDP1 and the first member portion MMP1 to each other.

The first adhesive portion ALP1 includes first sub-adhesive portions SSALP1 and SSALP2 and a second sub-adhesive portion SALP2. The first sub-adhesive portions SSALP1 and SSALP2 and the second sub-adhesive portion SALP2 are connected to each other and generally extend along the second direction DR2. The first sub-adhesive portions SSALP1 and SSALP2 make contact with (e.g., are adhered to) respective ones of the bending portions BP1 and BP2 and respective ones of the first bending member portions SBMMP1 and SBMMP2. The first sub-adhesive portions SSALP1 and SSALP2 are attached to the respective bending portions BP1 and BP2 and the respective first bending member portions SBMMP1 and SBMMP2 to fix the bending portions BP1 and BP2 and the first bending member portions SBMMP1 and SBMMP2 to respective ones of one another. The second sub-adhesive portion SALP2 is connected to the first sub-adhesive portions SSALP1 and SSALP2. The second sub-adhesive SALP2 makes contact with the non-bending portion NBP and the first non-bending member portion NMMP1. The second sub-adhesive SALP2 is attached to each of the non-bending portion NBP and the first non-bending member portion NMMP1 to fix the non-bending portion NBP and the first non-bending member portion NMMP1 to each other.

The first sub-adhesive portions SSALP1 and SSALP2 include a first bending adhesive portion SSALP1 and a second bending adhesive SSALP2. The first bending adhesive portion SSALP1 is connected to the second sub-adhesive portion SALP2. The first bending adhesive portion SSALP1 makes contact with (e.g., is adhered to) the first bending portion BP1 and the first sub-bending member portion SBMMP1. The first bending adhesive portion SSALP1 is attached to each of the first bending portion BP1 and the first sub-bending member portion SBMMP1 to fix the first bending portion BP1 and the first sub-bending member portion SBMMP1 to each other. The second bending adhesive portion SSALP2 is connected to the second sub-adhesive portion SALP2, and is spaced from the first bending adhesive portion SSALP1. The second bending adhesive portion SSALP2 makes contact with (e.g., is adhered to) the second bending portion BP2 and the second sub-bending member portion SBMMP2. The second bending adhesive portion SSALP2 is attached to each of the second bending portion BP2 and the second sub-bending member portion SBMMP2 to fix the second bending portion BP2 and the second sub-bending member portion SBMMP2 to each other.

The second adhesive portion ALP2 is connected to the first adhesive portion ALP1. The second adhesive portion ALP2 makes contact with (e.g., is adhered to) the light blocking layers SP1 and SP2 and the second member portion MMP2. The second adhesive portion ALP2 is attached to each of the light blocking layers SP1 and SP2 and the second member portion MMP2 to fix the light blocking layers SP1 and SP2 and the second member portion MMP2 to each other.

The second adhesive portion ALP2 includes the third sub-adhesive portion SALP3 and the fourth sub-adhesive portion SALP4. The third sub-adhesive portion SALP3 is connected to the first adhesive portion ALP1. The third sub-adhesive portion SALP3 makes contact with (e.g., is adhered to) the first light blocking layer SP1 and the first sub-member portion SMMP1. The third sub-adhesive portion SALP3 is attached to each of the first light blocking layer SP1 and the first sub-member portion SMMP1 to fix the first light blocking layer SP1 and the first sub-member portion SMMP1 to each other. The third sub-adhesive portion SALP3 makes contact with one side surface of the first light blocking layer SP1.

The fourth sub-adhesive portion SALP4 is connected to the first adhesive portion ALP1, and is spaced from the third sub-adhesive portion SALP3. The fourth sub-adhesive portion SALP4 makes contact with (e.g., is adhered to) the second light blocking layer SP2 and the second sub-member portion SMMP2. The fourth sub-adhesive portion SALP4 is attached to each of the second light blocking layer SP2 and the second sub-member portion SMMP2 to fix the second light blocking layer SP2 and the second sub-member portion SMMP2 to each other. The fourth sub-adhesive portion SALP4 makes contact (e.g., is adhered to) with one side surface of the second light blocking layer SP2.

Each of the first and second bending adhesive portions SSALP1 and SSALP2 have a modulus that is less than a modulus of each of the third and fourth sub-adhesive portions SALP3 and SALP4. Each of the first and second bending adhesive portions SSALP1 and SSALP2 have a hardness that is less than a hardness of each of the third and fourth sub-adhesive portions SALP3 and SALP4.

Each of the modulus of the first bending adhesive portion SSALP1 and the modulus of the second bending adhesive portion SSALP2 may be less than a modulus of the second adhesive portion ALP2. The hardness of the first bending adhesive portion SSALP1 and the hardness of the second bending adhesive portion SSALP2 may be less than a hardness of the second adhesive portion ALP2.

The modulus of the first bending adhesive portion SSALP1 may be substantially the same as, or different from, the modulus of the second bending adhesive portion SSALP2. The hardness of the first bending adhesive portion SSALP1 may be substantially the same as, or different from, the hardness of the second bending adhesive portion SSALP2.

The modulus of the third sub-adhesive portion SALP3 may be substantially the same as, or different from, the modulus of the fourth sub-adhesive portion SALP4. The hardness of the third sub-adhesive portion SALP3 may be substantially the same as, or different from, the hardness of the fourth sub-adhesive portion SALP4.

Each of the modulus of the third sub-adhesive portion SALP3 and the modulus of the fourth sub-adhesive portion SALP4 may be substantially the same as the modulus of the second adhesive portion ALP2, although embodiments of the present invention should not be limited thereto or thereby. For example, each of the modulus of the third sub-adhesive portion SALP3 and the modulus of the fourth sub-adhesive portion SALP4 may be greater than the modulus of the second adhesive portion ALP2. Each of the hardness of the third sub-adhesive portion SALP3 and the hardness of the fourth sub-adhesive portion SALP4 may be substantially the same as the hardness of the second adhesive portion ALP2, although the embodiments of the present invention should not be limited thereto or thereby. For example, each of the hardness of the third sub-adhesive portion SALP3 and the hardness of the fourth sub-adhesive portion SALP4 may be greater than the hardness of the second adhesive portion ALP2.

Figure 3A:
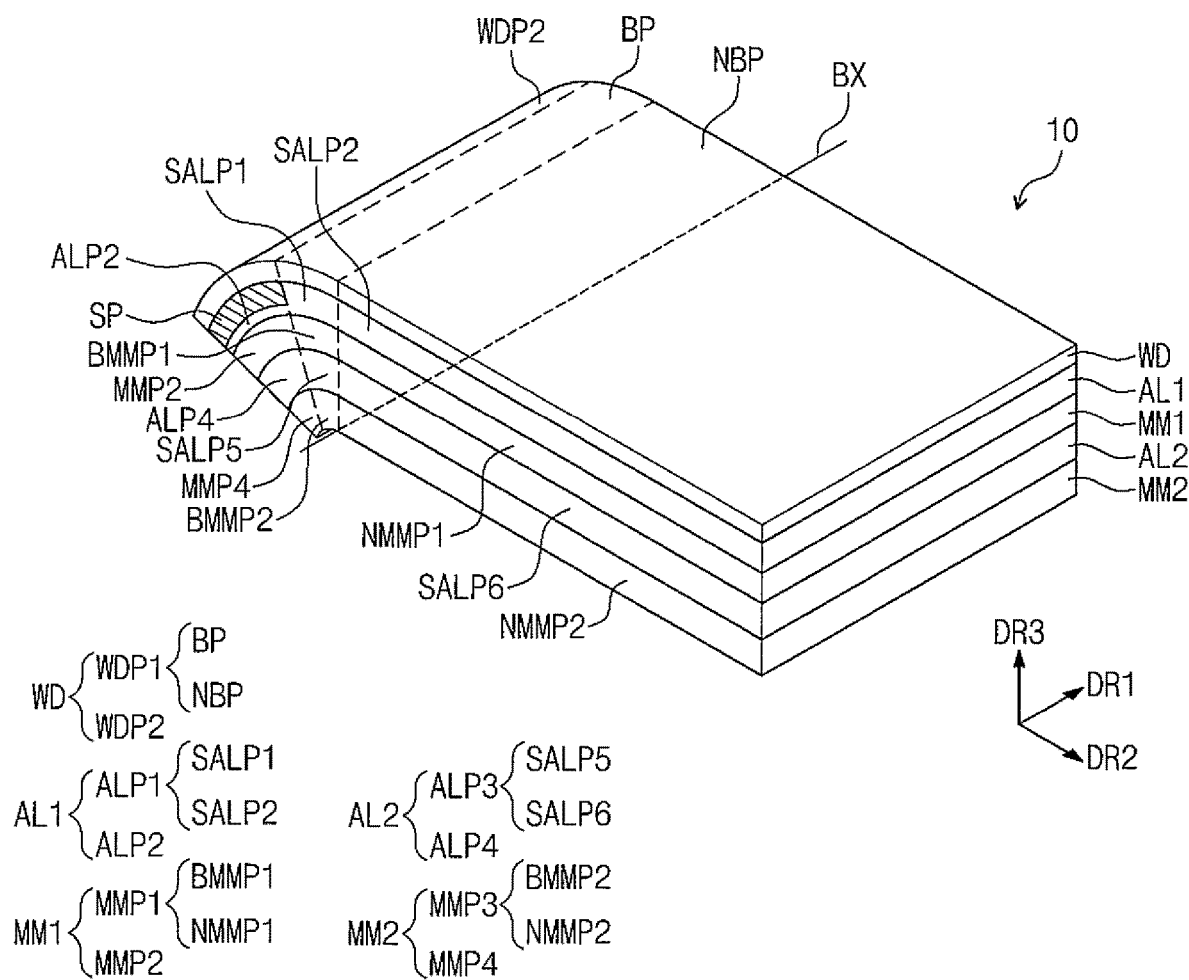
FIG. 3A is a perspective view showing a display device according to an exemplary embodiment of the present disclosure.
Figure 3B:
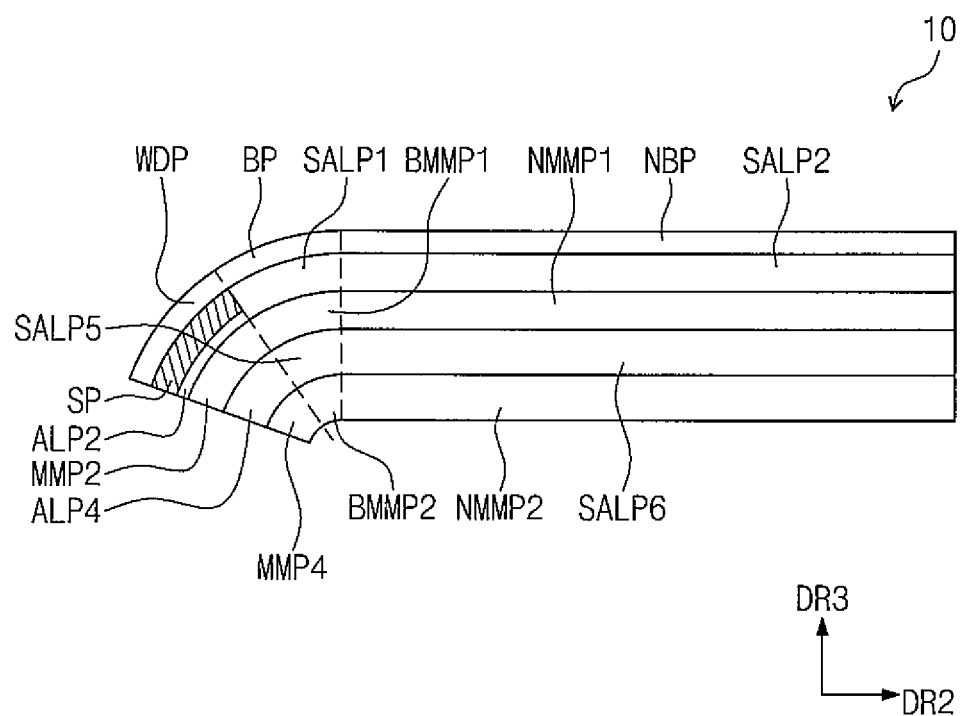
FIG. 3B is a cross-sectional view showing the display device shown in FIG. 3A.

FIG. 3A is a perspective view showing a display device 10 according to an exemplary embodiment of the present disclosure, and FIG. 3B is a cross-sectional view showing the display device 10 shown in FIG. 3A.

Hereinafter, the display device 10 according to the present exemplary embodiment will be described in detail with reference to FIGS. 3A and 3B. In FIGS. 3A and 3B, features of the display device are primarily described that are different from those of the display device shown in FIGS. 1A and 1B and from those of the display device shown in FIGS. 2A and 2B.

Referring to FIGS. 3A and 3B, the display device 10 includes a first member MM1, a window WD, a light blocking layer SP, a first adhesive layer AL1, a second member MM2, and a second adhesive layer AL2. The first member MM1 includes at least one of a polarizing plate, a display panel, and a touch screen panel. The first member MM1 may be flexible or rigid.

The first member MM1 includes a first member portion MMP1 and a second member portion MMP2. The first member portion MMP1 makes contact with (e.g., is adhered to) a first adhesive portion ALP1. The second member portion MMP2 is connected to the first member portion MMP1. The second member portion MMP2 makes contact with (e.g., is adhered to) a second adhesive portion ALP2. The first member portion MMP1 includes a first bending member portion BMMP1 and a first non-bending member portion NMMP1. The first bending member portion BMMP1 is bent with respect to (e.g., about) a bending axis BX extending in a first direction DR1. The first bending member portion BMMP1 makes contact with (e.g., is adhered to) a first sub-adhesive portion SALP1. The first non-bending member portion NMMP1 is connected to the first bending member portion BMMP1. The first non-bending member portion NMMP1 may be flat without being bent. The first non-bending member portion NMMP1 makes contact with (e.g., is adhered to) a second sub-adhesive portion SALP2.

The window WD is disposed on the first member MM1. The window WD may be flexible or rigid. The window WD includes a first window portion WDP1 and a second window portion WDP2. The first window portion WDP1 makes contact with (e.g., is adhered to) the first adhesive layer AL1 and does not make contact with the light blocking layer SP. The first window portion WDP1 includes a bending portion BP and a non-bending portion NBP. The bending portion BP is bent with respect to (e.g., about) the bending axis BX extending in the first direction DR1. The non-bending portion NBP may be flat without being bent. The second window portion WDP2 makes contact with the light blocking layer SP, and does not make contact with the first adhesive layer AL1.

The light blocking layer SP is between the window WD and the first adhesive layer AL1. The light blocking layer SP makes contact with the second window portion WDP2. The light blocking layer SP does not make contact with the first window portion WDP1.

The first adhesive layer AL1 is between the first member MM1 and the window WD. The first adhesive layer AL1 includes the first adhesive portion ALP1 and the second adhesive portion ALP2. The first adhesive portion ALP1 makes contact with (e.g., is adhered to) the first window portion WDP1 and the first member portion MMP1. The first adhesive portion ALP1 is attached to each of the first window portion WDP1 and the first member portion MMP1 to fix the first window portion WDP1 and the first member portion MMP1 to each other. The second adhesive portion ALP2 makes contact with (e.g., is adhered to) the light blocking layer SP and the second member portion MMP2. The second adhesive portion ALP2 is attached to each of the light blocking layer SP and the second member portion MMP2 to fix the light blocking layer SP and the second member portion MMP2 to each other.

The first adhesive portion ALP1 includes a first sub-adhesive portion SALP1 and a second sub-adhesive portion SALP2. The first sub-adhesive portion SALP1 makes contact with (e.g., is adhered to) the bending portion BP and the first bending member portion BMMP1. The first sub-adhesive portion SALP1 is attached to the bending portion BP and the first bending member portion BMMP1 to fix the bending portion BP and the first bending member portion BMMP1 to each other. The first sub-adhesive portion SALP1 makes contact with one side surface of the light blocking layer SP.

The second adhesive portion ALP2 is connected to the first sub-adhesive portion SALP1. The second sub-adhesive portion SALP2 makes contact with (e.g., is adhered to) the non-bending portion NBP and the first non-bending member portion NMMP1. The second sub-adhesive portion SALP2 is attached to the non-bending portion NBP and the first non-bending member portion NMMP1 to fix the non-bending portion NBP and the first non-bending member portion NMMP1 to each other.

The first sub-adhesive portion SALP1 has a modulus that is less than a modulus of the second sub-adhesive portion SALP2 and that is less than a modulus of the second adhesive portion ALP2. The first sub-adhesive portion SALP1 has a hardness that is less than a hardness of the second sub-adhesive portion SALP2 and that is less than a hardness of the second adhesive portion ALP2.

The modulus of the second sub-adhesive portion SALP2 may be substantially the same as the modulus of the second adhesive portion ALP2. The hardness of the second sub-adhesive portion SALP2 may be substantially the same as the hardness of the second adhesive portion ALP2, although embodiments of the present invention should not be limited thereto or thereby. For example, the modulus of the second sub-adhesive portion SALP2 may be less than the modulus of the second adhesive portion ALP2. Further, the hardness of the second sub-adhesive portion SALP2 may be less than the hardness of the second adhesive portion ALP2.

The second member MM2 is under the first member MM1. The second member MM2 may be different from the first member MM1. The second member MM2 may include at least one of the polarization plate, the display panel, and the touch screen panel. The second member MM2 may be flexible or rigid.

The second member MM2 includes a third member portion MMP3 and a fourth member portion MMP4. The fourth member portion MMP4 is connected to the third member portion MMP3. The fourth member portion MMP4 makes contact with (e.g., is adhered to) the fourth adhesive portion ALP4. The third member portion MMP3 includes a second bending member portion BMMP2 and a second non-bending member portion NMMP2. The second bending member portion BMMP2 is bent with respect to (e.g., about) the bending axis BX extending in the first direction DR1. The second bending member portion BMMP2 makes contact with (e.g., is adhered to) a fifth sub-adhesive portion SALP5. The second non-bending member portion NMMP2 is connected to the second bending member portion BMMP2. The second non-bending member portion NMMP2 may be flat without being bent. The second non-bending member portion NMMP2 makes contact with (e.g., is adhered to) a sixth sub-adhesive portion SALP6.

The second adhesive layer AL2 is between the first member MM1 and the second member MM2. The second adhesive layer AL2 is attached to each of the first member MM1 and the second member MM2 to fix the first member MM1 and the second member MM2 to each other. The second adhesive layer AL2 includes at least one of an acrylic-based compound and an acrylic-based copolymer. The second adhesive layer AL2 includes a UV curing agent.

The second adhesive layer AL2 includes the third adhesive portion ALP3 and the fourth adhesive portion ALP4. The third adhesive portion ALP3 makes contact with (e.g., is adhered to) the first member portion MMP1 and a third member portion MMP3. The third adhesive portion ALP3 is attached to each of the first member portion MMP1 and the third member portion MMP3 to fix the first member portion MMP1 and the third member portion MMP3. The fourth adhesive portion ALP4 is connected to the third adhesive portion ALP3. The fourth adhesive portion ALP4 makes contact with (e.g., is adhered to) the second member portion MMP2 and the fourth member portion MMP4. The fourth adhesive portion ALP4 is attached to each of the second member portion MMP2 and the fourth member portion MMP4 to fix the second member portion MMP2 and the fourth member portion MMP4 to each other.

The third adhesive portion ALP3 includes the fifth sub-adhesive portion SALP5 and the sixth sub-adhesive portion SALP6. The fifth sub-adhesive portion SALP5 makes contact with (e.g., is adhered to) the first bending member portion BMMP1 and the second bending member portion BMMP2. The fifth sub-adhesive portion SALP5 is attached to each of the first bending member portion BMMP1 and the second bending member portion BMMP2 to fix the first bending member portion BMMP1 and the second bending member portion BMMP2 to each other. The fifth sub-adhesive portion SALP5 makes contact with (e.g., is adhered to) one side surface of the fourth adhesive portion ALP4.

The sixth sub-adhesive portion SALP6 is connected to the fifth sub-adhesive portion SALP5. The sixth sub-adhesive portion SALP6 makes contact with (e.g., is adhered to) the first non-bending member portion NMMP1 and the second non-bending member portion NMMP2. The sixth sub-adhesive portion SALP6 is attached to each of the first non-bending member portion NMMP1 and the second non-bending member portion NMMP2 to fix the first non-bending member portion NMMP1 and the second non-bending member portion NMMP2 to each other.

The fifth sub-adhesive portion SALP5 has a modulus that is less than each of a modulus of the sixth sub-adhesive portion SALP6 and a modulus of the fourth adhesive portion ALP4. The fifth sub-adhesive portion SALP5 has a hardness that is less than each of a hardness of the sixth sub-adhesive portion SALP6 and a hardness of the fourth adhesive portion ALP4.

The modulus of the fifth sub-adhesive portion SALP5 may be substantially the same as the modulus of the first sub-adhesive portion SALP1. The hardness of the fifth sub-adhesive portion SALP5 may be substantially the same as the hardness of the first sub-adhesive portion SALP1, although embodiments of the present invention should not be limited thereto or thereby. For example, the modulus of the fifth sub-adhesive portion SALP5 may be different from the modulus of the first sub-adhesive portion SALP1. Further, the hardness of the fifth sub-adhesive portion SALP5 may be different from the hardness of the first sub-adhesive portion SALP1.

The modulus of the sixth sub-adhesive portion SALP6 may be substantially the same as the modulus of the fourth adhesive portion ALP4. The hardness of the sixth sub-adhesive portion SALP6 may be substantially the same as the hardness of the fourth adhesive portion ALP4, although embodiments of the present invention should not be limited thereto or thereby. For example, the modulus of the sixth sub-adhesive portion SALP6 may be less than the modulus of the fourth adhesive portion ALP4. Further, the hardness of the sixth sub-adhesive portion SALP6 may be less than the hardness of the fourth adhesive portion ALP4.

The modulus of the sixth sub-adhesive portion SALP6 may be substantially the same as the modulus of the second sub-adhesive portion SALP2. The hardness of the sixth sub-adhesive portion SALP6 may be substantially the same as the hardness of the second sub-adhesive portion SALP2, although embodiments of the present invention should not be limited thereto or thereby. For example, the modulus of the sixth sub-adhesive portion SALP6 may be different from the modulus of the second sub-adhesive portion SALP2. Further, the hardness of the sixth sub-adhesive portion SALP6 may be different from the hardness of the second sub-adhesive portion SALP2.

In general, a first adhesive layer included in a conventional display device has only one modulus (e.g., a single modulus throughout the layer). Accordingly, the first adhesive layer may not be sufficient for attaching to a step difference portion between a window and a light blocking layer. As a result, the first adhesive layer may be gradually spaced from (e.g., separated from) the step difference portion when the conventional display device is bent.

The first adhesive layer included in the display device according to the exemplary embodiments of the present disclosure has a plurality of moduli. In the first adhesive layer included in the display device according to the exemplary embodiments of the present disclosure, the modulus of the first sub-adhesive portion, which makes contact with the bending portion of the window and the one side surface of the light blocking layer, is less than each of the modulus of the second sub-adhesive portion making contact with the non-bending portion of the window, and the modulus of the second adhesive portion making contact with the light blocking layer. Because the first sub-adhesive portion has flexibility that is greater than that of each of the second sub-adhesive portion and the second adhesive portion, the first adhesive layer may be securely attached to the step difference portion caused by the window and the light blocking layer, and thus the first adhesive layer may be prevented or substantially prevented from being spaced from the step difference portion even though the display device is bent. Therefore, the display device according to the exemplary embodiments of the present disclosure may have improved (e.g., increased) durability.

Hereinafter, a method of manufacturing the display device will be described in detail.

Figure 4:
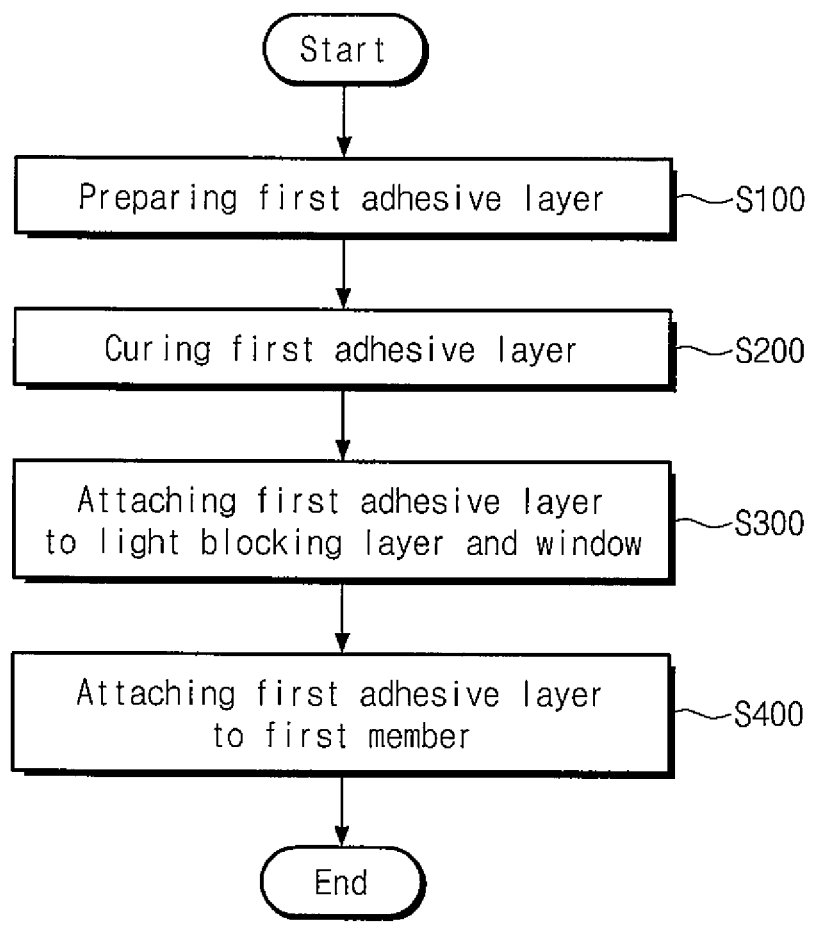
FIG. 4 is a flow diagram showing a method of manufacturing a display device according to an exemplary embodiment of the present disclosure.

FIG. 4 is a flow diagram showing a method of manufacturing a display device according to an exemplary embodiment of the present disclosure, and FIGS. 5A to 5E are cross-sectional views showing processes of the manufacturing method of the display device according to an exemplary embodiment of the present disclosure.

Referring to FIGS. 4 and 5A to 5E, the manufacturing method of the display device includes preparing the first adhesive layer AL1, which includes the first adhesive portion ALP1 including the first sub-adhesive portion SALP1, and the second sub-adhesive portion SALP2 (S100), curing the first adhesive layer AL1 such that the hardness of the first sub-adhesive portion SALP1 is less than the hardness of each of the second sub-adhesive portion SALP2 and the second adhesive portion ALP2 (S200), attaching the first adhesive layer AL1 to the light blocking layer SP and the window WD (S300), and attaching the first adhesive layer AL1 to the first member MM1 (S400).

Figure 5A:
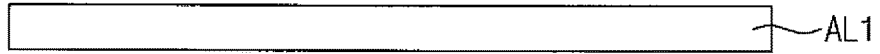
FIGS. 5A-5E are cross-sectional views showing processes of the manufacturing method of the display device according to an exemplary embodiment of the present disclosure.

Referring to FIGS. 4 and 5A, the first adhesive layer AL1 is prepared (S100). The first adhesive layer AL1 includes the first adhesive portion ALP1 and the second adhesive portion ALP2. The first adhesive portion ALP1 includes the first sub-adhesive portion SALP1 and the second sub-adhesive portion SALP2. The first adhesive layer AL1 includes at least one of an acrylic-based compound and an acrylic-based copolymer, although the first adhesive layer AL1 should not be limited thereto or thereby. For example, the first adhesive layer AL1 may include the UV curing agent.

Figure 5B:
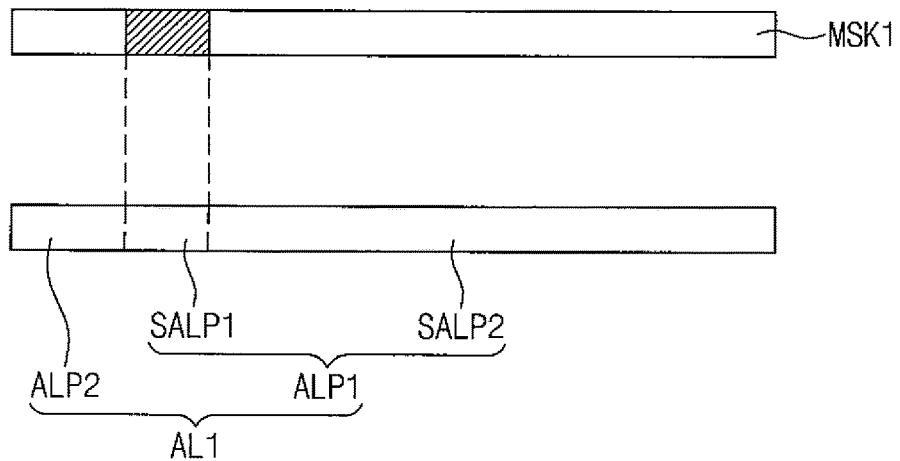
Figure 5C:
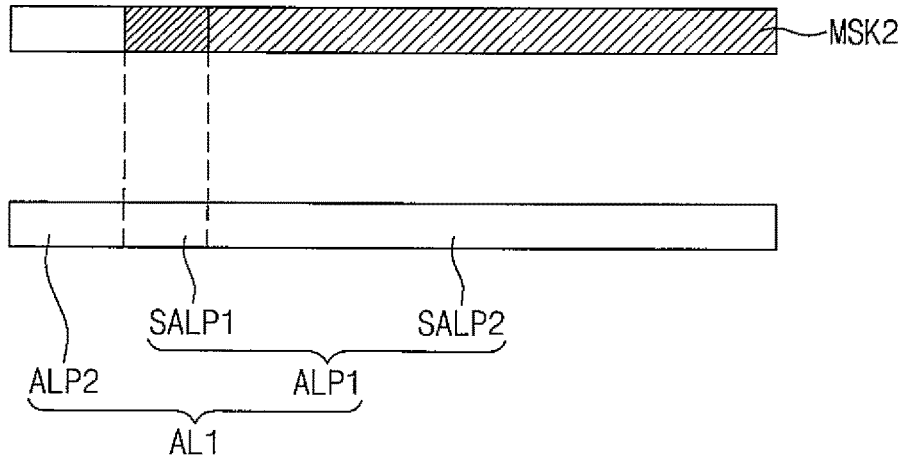

Referring to FIGS. 4, 5B, and 5C, the first adhesive layer AL1 is cured such that the hardness of the first sub-adhesive portion SALP1 is less than the hardness of each of the second sub-adhesive portion SALP2 and the second adhesive portion ALP2 (S200). The curing of the first adhesive layer AL1 (S200) includes providing a mask above the first adhesive layer AL1 and applying a UV light to the first adhesive layer AL1 using the mask. The curing of the first adhesive layer AL1 (S200) may be performed before or after the attaching of the first adhesive layer AL1 to the window WD.

Referring to FIGS. 4 and 5B, a first mask MSK1 is above the first adhesive layer AL1 and the UV light is provided to the first adhesive layer AL1 through the first mask MSK1. The first adhesive layer AL1 is cured using the first mask MSK1 such that the hardness of the first sub-adhesive portion SALP1 is less than the hardness of each of the second sub-adhesive portion SALP2 and the second adhesive portion ALP2. The hardness of the second sub-adhesive portion SALP2 may be substantially the same as the hardness of the second adhesive portion ALP2. The modulus of the first sub-adhesive portion SALP1 may be less than the modulus of each of the second sub-adhesive portion SALP2 and the second adhesive portion ALP2. The modulus of the second sub-adhesive portion SALP2 may be substantially the same as the modulus of the second adhesive portion ALP2.

Referring to FIGS. 4 and 5C, a second mask MSK2 is disposed above the first adhesive layer AL1 and the UV light is provided to (e.g., is applied to or shone upon) the first adhesive layer AL1 through the second mask MSK2. The first adhesive layer AL1 is cured using the second mask MSK2 such that the hardness of the first sub-adhesive portion SALP1 is less than the hardness of each of the second sub-adhesive portion SALP2 and the second adhesive portion ALP2. The hardness of the second sub-adhesive portion SALP2 may be less than the hardness of the second adhesive portion ALP2. The modulus of the first sub-adhesive portion SALP1 may be less than the modulus of each of the second sub-adhesive portion SALP2 and the second adhesive portion ALP2. The modulus of the second sub-adhesive portion SALP2 may be less than the modulus of the second adhesive portion ALP2.

Figure 5D:
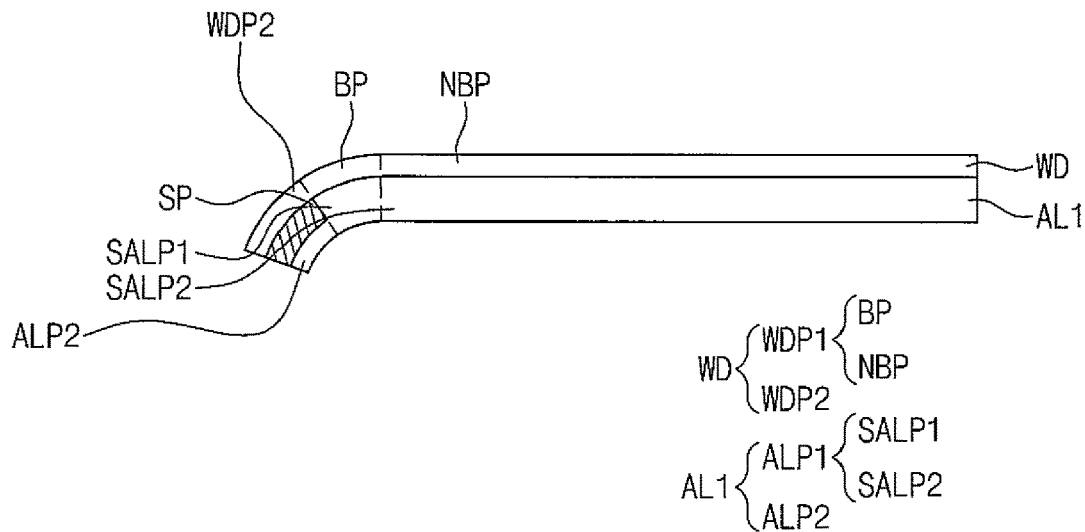

Referring to FIGS. 4 and 5D, the first adhesive layer AL1 is attached to the light blocking layer SP and the window WD (S300). The window WD includes the first window portion WDP1 and the second window portion WDP2. The first window portion WDP1 includes the bending portion BP and the non-bending portion NBP. The second window portion WDP2 makes contact with the light blocking layer SP. The second window portion WDP2 is connected to the first window portion WDP1. The second window portion WDP2 is spaced from the non-bending portion NBP, and is connected to the bending portion BP. The attaching of the first adhesive layer AL1 to the light blocking layer SP and the window WD (S300) is performed such that the first sub-adhesive portion SALP1 is attached to the bending portion BP, the second sub-adhesive portion SALP2 is attached to the non-bending portion NBP, and the second adhesive portion ALP2 is attached to the light blocking layer SP.

Figure 5E:
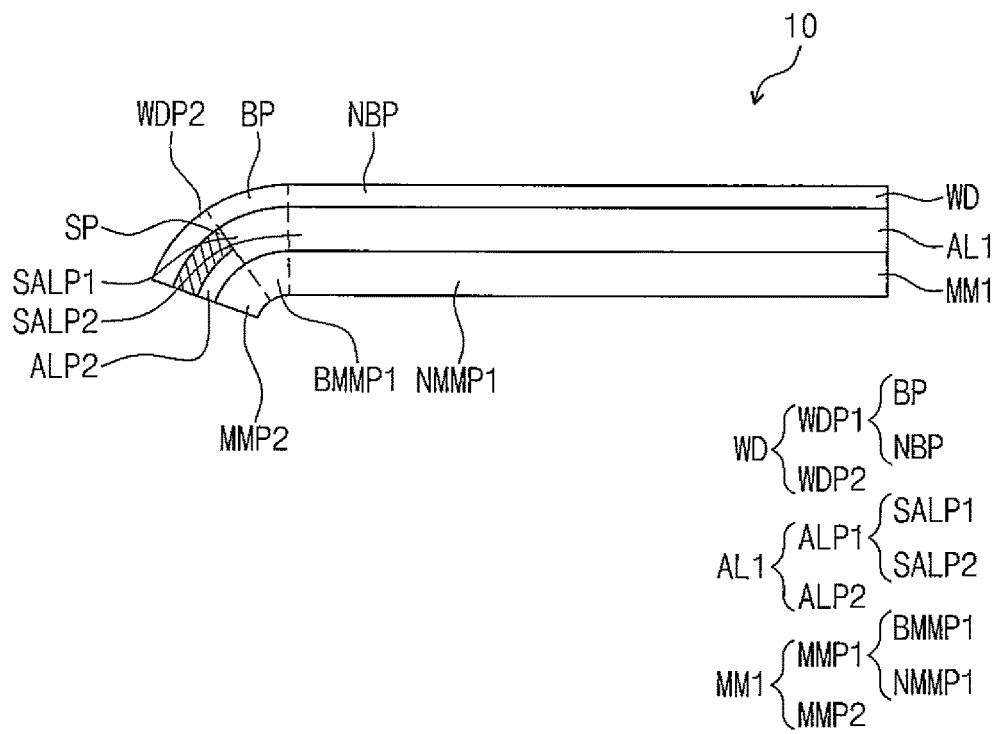

Referring to FIGS. 5 and 5E, the first adhesive layer AL1 is attached to the first member MM1 (S400). The first member MM1 includes the first member portion MMP1 and the second member portion MMP2. The first member portion MMP1 includes the first bending member portion BMMP1 and the first non-bending member portion NMMP1. The second member portion MMP2 is connected to the first member portion MMP1. The second member portion MMP2 makes contact with (e.g., is adhered to) the second adhesive portion ALP2. The attaching of the first adhesive layer AL1 to the first member MM1 (S400) may include attaching the first adhesive portion ALP1 to the first member portion MMP1, and may include attaching the second adhesive portion ALP2 to the second member portion MMP2. The attaching of the first adhesive layer AL1 to the first member MM1 (S400) may include attaching the first sub-adhesive portion SALP1 to the first bending member portion BMMP1, and may include attaching the second sub-adhesive portion SALP2 to the first non-bending member portion NMMP1.

The attaching of the first adhesive layer AL1 to the light blocking layer SP and the window WD (S300) and the attaching of the first adhesive layer AL1 and the first member MM1 (S400) may be concurrently (e.g., substantially simultaneously) performed, although embodiments of the present invention should not be limited thereto or thereby. For example, the attaching of the first adhesive layer AL1 and the first member MM1 (S400) may be performed after the attaching of the first adhesive layer AL1 to the light blocking layer SP and the window WD (S300) is performed, and the attaching of the first adhesive layer AL1 to the light blocking layer SP and the window WD (S300) may be performed after the attaching of the first adhesive layer AL1 and the first member MM1 (S400) is performed.

In general, the first adhesive layer included in the conventional display device has only one modulus. Accordingly, the first adhesive layer may not be sufficient for attaching to the step difference portion between the window and the light blocking layer. As a result, the first adhesive layer may be gradually spaced from (e.g., separated from) the step difference portion when the conventional display device is bent.

The first adhesive layer included in the display device manufactured by the manufacturing method according to the exemplary embodiments of the present disclosure has the moduli. In the first adhesive layer included in the display device according to the exemplary embodiments of the present disclosure, the modulus of the first sub-adhesive portion making contact with the bending portion of the window and the one side surface of the light blocking layer is less than each of the modulus of the second sub-adhesive portion making contact with the non-bending portion of the window and the modulus of the second adhesive portion making contact with the light blocking layer. Because the first sub-adhesive portion has flexibility greater than that of each of the second sub-adhesive portion and the second adhesive portion, the first adhesive layer may be securely attached to the step difference portion caused by the window and the light blocking layer, and thus the first adhesive layer may be prevented or substantially prevented from being spaced from the step difference portion even though the display device is bent. Therefore, the display device according to the exemplary embodiments of the present disclosure may have improved (e.g., increased) durability.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", or "coupled to" another element or layer, it can be directly on, connected to, or coupled to the other element or layer, or one or more intervening elements or layers may be present. When an element or layer is referred to as being "directly on," "directly connected to", or "directly coupled to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Although the exemplary embodiments of the present invention have been described, it is understood that the present invention should not be limited to these exemplary embodiments but various suitable changes and modifications can be made by one ordinary skilled in the art within the spirit and scope of the present invention as defined by the appended claims and equivalents thereof.

What is claimed is:

1. A display device comprising:
a first member;
a window on the first member;
a first adhesive layer between the first member and the window; and
a light blocking layer between the window and the first adhesive layer, the window comprising:
a first window portion contacting the first adhesive layer and comprising a bending portion and a non-bending portion; and
a second window portion connected to the bending portion, the second window portion being spaced from the non-bending portion and directly contacting a first surface of the light blocking layer,
wherein the first adhesive layer comprises:
a first adhesive portion comprising a first sub-adhesive portion contacting the bending portion, and a second sub-adhesive portion contacting the non-bending portion; and
a second adhesive portion directly contacting a second surface of the light blocking layer, the second surface being opposite from the first surface of the light blocking layer, and
wherein the first sub-adhesive portion has a modulus that is less than a modulus of each of the second sub-adhesive portion and the second adhesive portion.

2. The display device of claim 1, wherein the first sub-adhesive portion has a hardness that is less than a hardness of each of the second sub-adhesive portion and the second adhesive portion.

3. The display device of claim 1, wherein the first sub-adhesive portion contacts one side surface of the light blocking layer, and contacts the bending portion.

4. The display device of claim 1, wherein the modulus of the second sub-adhesive portion is equal to or less than the modulus of the second adhesive portion.

5. The display device of claim 1, wherein the bending portion comprises:
a first bending portion connected to the non-bending portion; and
a second bending portion connected to the non-bending portion and spaced from the first bending portion, and
wherein the first adhesive portion comprises:
a first bending adhesive portion contacting the first bending portion; and
a second bending adhesive portion contacting the second bending portion.

6. The display device of claim 5, wherein the light blocking layer comprises:
a first light blocking layer; and
a second light blocking layer spaced from the first light blocking layer,
wherein the second window portion comprises:
a first sub-window portion connected to the first window portion and the first light blocking layer; and
a second sub-window portion connected to the first window portion and the second light blocking layer, the second sub-window portion being spaced from the first sub-window portion,
wherein the second adhesive portion comprises:
a third sub-adhesive portion contacting the first light blocking layer; and
a fourth sub-adhesive portion contacting the second light blocking layer, and
wherein a modulus of the first bending adhesive portion and a modulus of the second bending adhesive portion are each less than each of a modulus of the third sub-adhesive portion and a modulus of the fourth sub-adhesive portion.

7. The display device of claim 1, wherein the first member comprises at least one of a polarizing plate, a display panel, and a touch screen panel.

8. The display device of claim 1, wherein the first adhesive layer comprises a UV curing agent.

9. The display device of claim 1, wherein the first adhesive layer comprises at least one of an acrylic-based compound or an acrylic-based copolymer.

10. The display device of claim 1, further comprising:
a second member under the first member; and
a second adhesive layer between the first member and the second member.

11. The display device of claim 10, wherein the first member comprises
a first member portion contacting the first adhesive portion; and
a second member portion contacting the second adhesive portion,
wherein the second adhesive layer comprises:
a third adhesive portion contacting the first member portion; and
a fourth adhesive portion contacting the second member portion,
wherein the first member portion comprises:
a first bending member portion contacting the first sub-adhesive portion; and
a first non-bending member portion contacting the second sub-adhesive portion,
wherein the third adhesive portion comprises:
a fifth sub-adhesive portion contacting the first bending member portion; and
a sixth sub-adhesive portion contacting the first non-bending member portion, and
wherein the fifth sub-adhesive portion has a modulus that is less than each of a modulus of the sixth sub-adhesive portion and a modulus of the fourth adhesive portion.

12. The display device of claim 11, wherein the modulus of the sixth sub-adhesive portion is equal to the modulus of the fourth adhesive portion.

13. The display device of claim 11, wherein the modulus of the sixth sub-adhesive portion is less than the modulus of the fourth adhesive portion.

14. The display device of claim 10, wherein the second member is different from the first member, and
wherein each of the first and second members comprises at least one of a polarizing plate, a display panel, and a touch screen panel.

\* \* \* \* \*